July 17, 1951          W. A. AYRES          2,560,538
APPARATUS FOR MAKING STEREOSCOPIC PICTURES
Filed Oct. 2, 1944          3 Sheets—Sheet 2
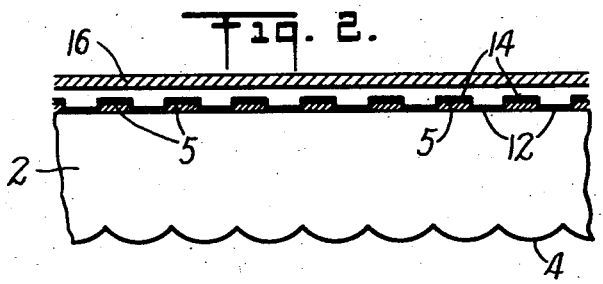
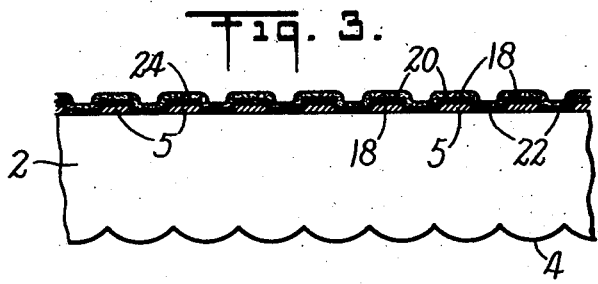
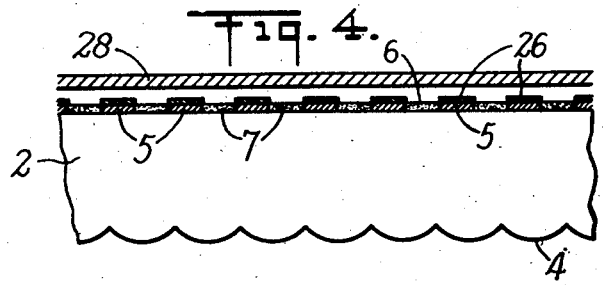
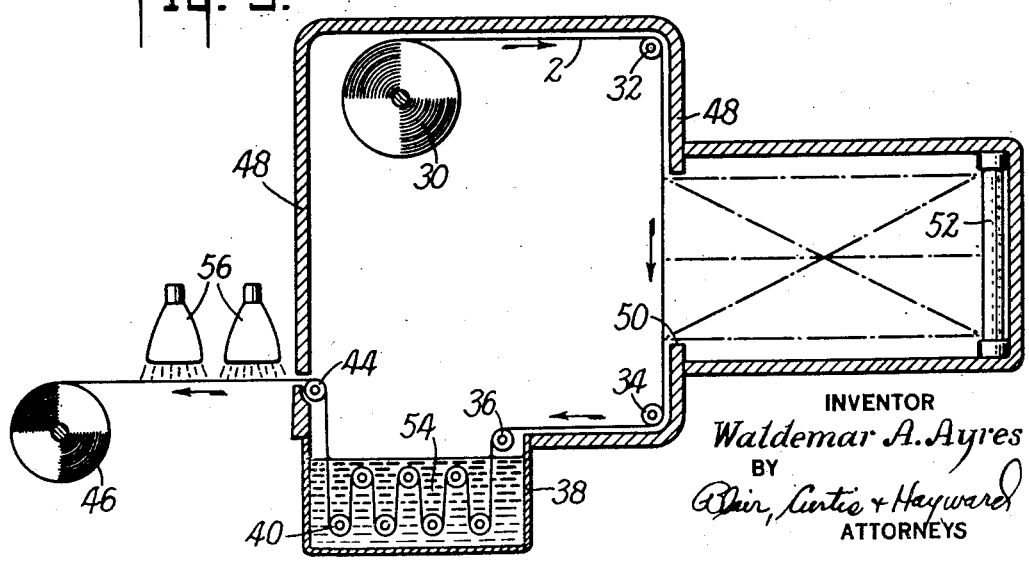
INVENTOR
Waldemar A. Ayres
BY
Blair, Curtis + Hayward
ATTORNEYS July 17, 1951  W. A. AYRES  2,560,538
APPARATUS FOR MAKING STEREOSCOPIC PICTURES
Filed Oct. 2, 1944  3 Sheets-Sheet 3
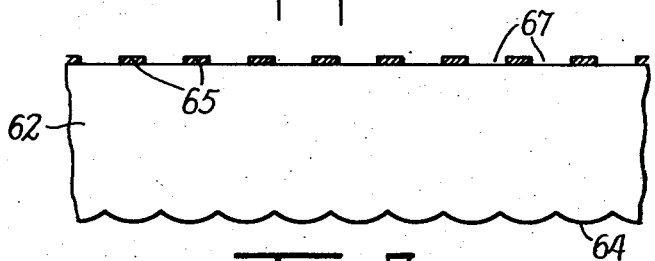
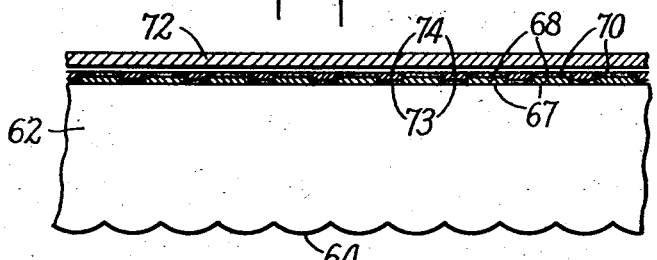
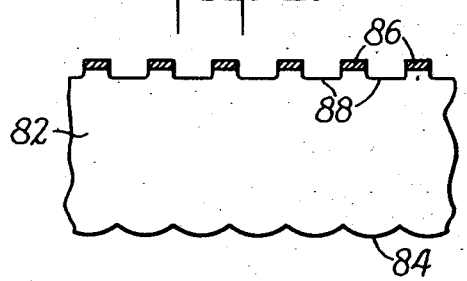
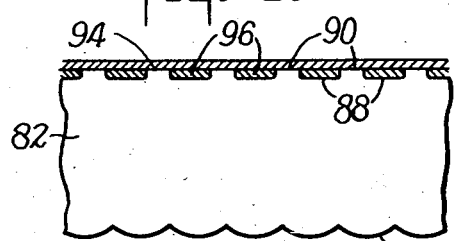
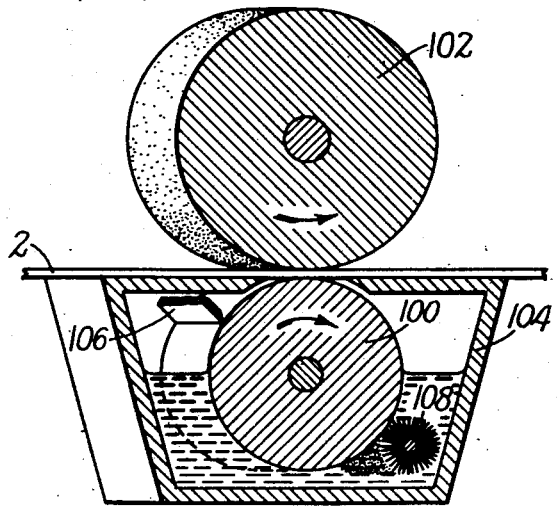
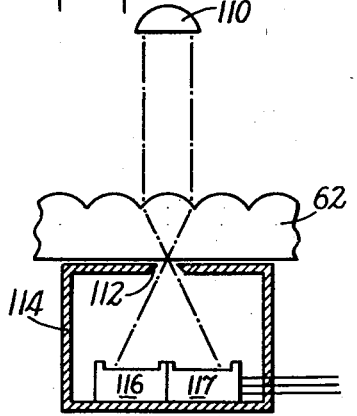
INVENTOR
Waldemar A. Ayres
BY
Blair, Curtis & Hayward
ATTORNEYS Patented July 17, 1951

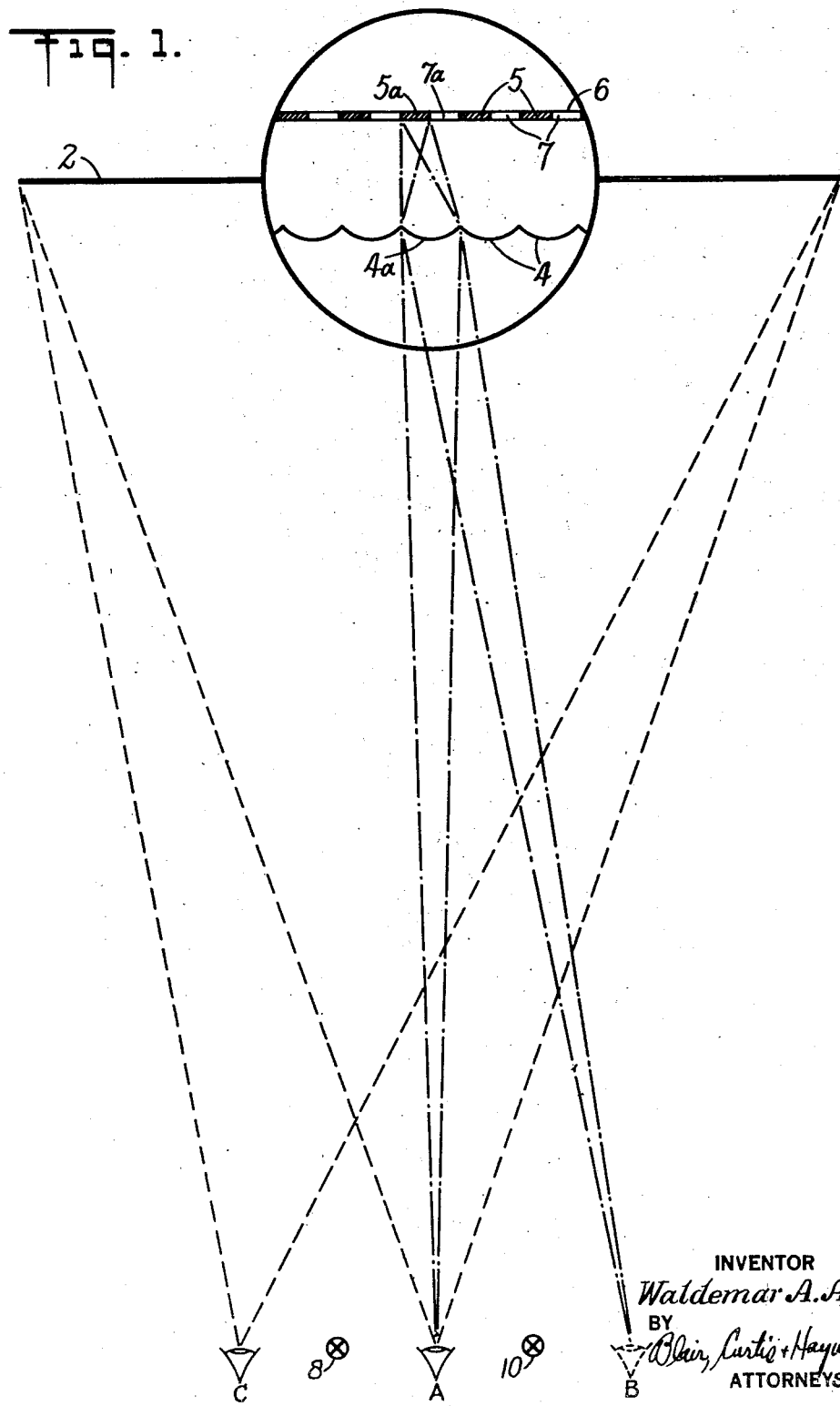

2,560,538

UNITED STATES PATENT OFFICE 2,560,538

APPARATUS FOR MAKING STEREOSCOPIC PICTURES

Waldemar A. Ayres, Kew Gardens Hills, N. Y., assignor to The Sperry Corporation, a corporation of Delaware Application October 2, 1944, Serial No. 556,736

4 Claims. (Cl. 88—29)

This invention relates to three-dimensional pictures and, more particularly, to a lenticulated transparent sheet having lenses on its front side and having on its back side a composite picture formed by alternate areas of a pair of stereoscopic views, and to materials, methods and apparatus adapted for making such pictures.

An object of this invention is to provide for the widespread use of stereoscopic pictures. A further object is to provide a method, apparatus and articles for producing stereoscopic pictures which do not have the objectionable features of the prior art and which are adaptable to widespread use. A further object is to so far reduce the cost of high quality stereoscopic pictures that they may be produced in quantity and used commercially in books, pamphlets, etc., as well as for decoration and display purposes. A further object is to provide articles of manufacture which may be sold commercially and which may be used in a variety of ways to produce three-dimensional pictures in much the same manner that photographic film and paper are sold and used. A further object is to provide for the production of a lenticulated picture formed by a pair of stereoscopic views with the individual portions of the views in exact alignment with the respective lenses through which the views appear to the observer. These and other objects will be in part obvious and in part pointed out below.

In this specification and the accompanying drawings, I have shown and described a preferred embodiment of my invention and various modifications thereof; it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 1 is a diagrammatic showing of one embodiment of the invention with the central portion of the lenticulated sheet enlarged to exaggerate the important features;

Figures 2, 3 and 4 are sectional views representing the forming of a stereoscopic picture from a sheet such as shown in Figure 1;

Figure 5 is a schematic showing of apparatus for producing an article such as that represented in Figure 1;

Figure 6 is a sectional view of another embodiment of the invention;

Figures 7, 8 and 9 are views representing one manner of using the article of Figures 1 and 6; and Figures 10 and 11 are partially schematic showings of apparatus used in carrying out the processes described in connection with Figures 2 and 6, respectively.

As conductive to a clearer understanding of the invention it is here pointed out that lenticulated stereoscopic pictures have been formed by a lenticulated sheet having on the back side alternate narrow strips of the right-eye and left-eye views of a stereoscopic pair. Each strip is aligned with a lens portion of the sheet so that the strip is seen only by the corresponding eye of a person from a normal viewing zone. These strips of each view are sufficiently narrow to blend into a composite picture in the same way as do the elements of a half-tone print. With these arrangements, the lenses have been aligned mechanically with the respective strips of the stereoscopic pair, and from a production standpoint, it is difficult to maintain the proper alignment. In accordance with the present invention the printing, or other manner of forming the view portions, is performed in a selective manner so that the printing of one view of the pair does not overrun onto the areas of the other view of the pair. Furthermore, perfect alignment is maintained without reliance on mechanical controls, so that each eye views through each lens only the proper areas.

In the preferred embodiment of the invention the two sets of strips which make up the composite stereoscopic views are individually aligned with the respective lenses on the front side of the sheet; this alignment is obtained by using the lenses optically to locate or select the respective areas or strips on the back side of the sheet for the printing of the stereoscopic pair. Accordingly, alignment is automatic and there is no problem as to the mechanical adjustment of the apparatus. Furthermore, the division of the back side of the sheet into areas is as accurate as the lenses require and at the same time minor inaccuracies of variations in the construction of the sheet are automatically compensated for, i. e., each particular lens selects the areas for its portions of the views and the appropriate areas are selected regardless of the variations in the lenses and in the sheet. This result can be obtained, for example, by coating the back side of the lenticulated sheet with a light-responsive layer and then exposing a portion of this layer to light from a source positioned in the viewing zones of one of the eyes. Thereafter the exposed area represents the area which is viewed by that particular eye and the unexposed area represents or includes the area which is viewed by the other eye. Thus by selectively producing appropriate portions of the two views respectively upon the exposed and unexposed areas of the layer the two eyes view the proper images.

In accordance with another embodiment of the invention, the coating is applied only in selected areas corresponding to the areas viewed by one eye. However, with this embodiment of the invention the success of the process depends upon the accuracy of the mechanical aligning of the strips of the coating with respect to the lenticulations and this accuracy is obtained optically.

Referring particularly to the enlarged portion of Figure 1 of the drawings, transparent sheet 2 of a film-like transparent material, such as that used for photographic film, is shown in cross-section with cylindrical lenses 4 on its front side and with a light-hardenable coating 6 on its back side. Coating 6 ordinarily contains gelatin, or other substances such as polyvinyl alcohol, etc., with a light-sensitizing agent therein such as potassium bichromate. For simplicity, this coating is referred to herein as gelatin but it is to be understood that other similar materials of known character subject to change upon exposure to light may be used. Before exposure to light, coating 6 is "unhardened" and it possesses the characteristics that it is easily wetted and absorbs water and it also is easily dissolved in hot water. However after exposure to light, coating 6 is "hardened" so that it does not wet easily, does not absorb as much water and it is not dissolved by hot water.

In Figure 1 strips 5 of coating 6 are represented in cross-section by shaded areas and these strips of the coating have been hardened whereas the strips 7 represented by unshaded areas are unhardened. Strips 5 have been hardened by projecting light toward the sheet from a source positioned in the viewing zone for the right eye. Thus as shown at the bottom of Figure 1, the normal position for the left and right eyes are represented at 8 and 10, but each eye may be moved laterally to any position within a distance of its side of the center line equal to the distance between the two eyes; thus, the right eye might move between the points designated A and B, and the left eye moves between points C and A. The area or zone through which each eye may be moved without distorting the picture is referred to herein as the respective viewing zone. In exposing strips 5, represented by the shaded areas, a point source light may be moved slowly between the points A and B, or the strip may be exposed to an elongated light extending from A to B.

It is here considered that the distance between the eyes of an average person is 2½ inches, and that the average person holds a picture approximately 14 inches from the eyes. These dimensions are assumed in the discussion of Figure 1, although as indicated above, the central portion of sheet 2 is shown greatly enlarged in order to bring out the structure more clearly, and the figure is not a true showing. In this figure special consideration is given to a particular lens, designated 4a, and its corresponding strips 5a and 7a of the coating 6. Strips 5 and 7 are not all of the same width nor are all of the strips positioned directly behind their respective lenses. However, each strip 5 is in optical alignment with its lens because the strip is formed by the light which passes through its lens; and this results in the intermediate strips 7 being properly aligned with their lenses.

The lenticulated sheet with its hardened and unhardened strips is a distinct article of manufacture which can be used in any one of a variety of ways. Illustratively, the bichromate may be dissolved from the unhardened gelatin by washing the sheet in cold water and thereafter the sheet may be exposed to light without further hardening or other change in the gelatin of strips 7. This sheet may then be printed upon by a selective printing process utilizing the characteristics that the unhardened gelatin is easily wetted and absorbs water, whereas, the hardened gelatin is not easily wetted and it does not absorb as much water.

In accordance with this process the dried sheet which has had the bichromate washed out is first wetted with water sufficiently to make the strips 7 repellent to an oil base ink, and to allow the hardened areas 5 to be selectively wetted by an oil or other lipophilic substance. The resulting sheet is printed separately with the left-eye view of a stereoscopic pair in an oil base ink which is retained only by the areas 5 and is rejected by the areas 7, and with the right-eye view of the pair in a water-miscible, oil-repellent ink which is retained only by the areas 7 and rejected by the areas 5. Thus the two views of the stereoscopic pair are printed in strips on their respective areas so as to be viewed from the viewing zones AB and CA, respectively.

In accordance with another process sheet 2 of Figure 1 is washed in hot water with the result that the unhardened gelatin of strips 7 is washed away leaving only the hardened strips 5. A stereoscopic picture made from a sheet which has been treated by this latter process is shown in Figure 2, there being on the sheet 2 the hardened strips 5 with strips of the sheet surface exposed in the areas between strips 5. The two views of the stereoscopic pair are printed onto the respective areas of the back side of the sheet, the printing being performed as follows: The left-hand, i. e., left-eye view is printed with a soft roll or transfer blanket (as in offset printing) over the entire back of the sheet covering the tops of strips 5 as well as the uncoated strip of the sheet surface formerly covered by strips 7. Next, the top surfaces of strips 5 are wiped clean, with the result that only the portions of the left-hand view designated 12, and appearing in the spaces between strips 5, remain. Next, the top surfaces of strips 5 are printed with the right-hand, i. e., right-eye, view at 14, using a hard roll or plate which does not extend down into the spaces between strips 5. Thus, the respective portions of the two views of the stereoscopic pair appear on the back of sheet 2 at 12 and 14 in the proper relationship to be viewed from a position of the eyes such as that designated in Figure 1 at 8 and 10. The left-hand view formed by the strips 12 Figure 2 is viewed through sheet 2 only, whereas the right-hand view formed by the strips 14 is viewed through sheet 2 and strips 5. A suitable paper or other backing 16 is applied to the back of sheet 2 for protection as well as to provide a light reflecting surface.

The removal of the initial printing from the surfaces of strips 5 in Figure 2 may be by various methods. One method of removing the printing from strips 5 is to position the sheet on a flat surface and rub the sheet with a ground glass surface. Preferably, before this rubbing operation, the sheet is wetted with a liquid which is not a solvent of the ink so that the ink is not dissolved, but particles of the ink are readily abraded off and carried away by the liquid and the sheet is then wiped dry.

Another arrangement for removing the initial printing from strips 5 is shown in Figure 10 wherein the sheet 2 is passed, with its lenticulated side up, over a roll 100 and beneath a rubber pressure roll 102. Considering sheet 2 moving to the right, roll 102 moves counterclockwise at a peripheral speed which is the same as the speed of the sheet whereas roll 100 rotates with a peripheral speed which is greater than the speed of the sheet. Roll 100 may be an ordinary inking roll, e. g. of a resilient glue-glycerine composition and its lower portion dips into a fountain 104 of naphtha or other ink solvent. A doctor blade 106 serves as a squeegee to remove adhering solvents and ink from roll 100 and a rotating brush 108 scrubs the roll. The solvent in fountain 104 is circulated through a filter, not shown, where ink pigments are removed or the solvent may be renewed with fresh solvent and the used solvent distilled.

Another manner of printing the picture of Figure 2 follows: The sheet is soaked in water so that the gelatin strips 5 absorb sufficient water to make them repellent, or are coated or wet by any suitable oil-repellent material, and then the left-hand view is printed on the back of the sheet using oil-base ink on a soft roll with the result that the ink "takes" at strips 12 whereas the ink does not "take" at strips 14. The right-hand view is then printed onto the gelatin strips 5 at strips 14 using an ink that is not repelled by water on a hard roll, and then the sheet is dried. Thus, the two views appear in their respective areas, and a backing 16 is then put in place to complete the picture.

In the embodiment of Figure 3 the sheet with hardened strips 5 thereon is printed first with the right-hand view using a hard roll or plate, with the result that strip portions of the right-hand view are formed only on the surfaces of strips 5 at 18. Next, an opaque light-reflecting coating 20 is put on over the surface of the printed strips 18, again using a hard roll. After the coating 20 is dry, the left-hand view is printed with a soft roll over the entire back surface of sheet 2; but due to the opaque coating 20 the left-hand view does not show through behind strips 18 and the right-hand view is not interfered with. However, the strips 22 of the left-hand view in the spaces between strips 5 appear from the front side of sheet 2 from the left-eye viewing zone. A heavy opaque light-reflecting coating 24 is then placed over the entire back of sheet 2, or alternatively a paper backing such as 16 in Figure 2 may be used.

In the embodiment of Figure 4 the sheet 2 shown in Figure 1 is washed in cold water until the potassium bichromate is leached from the strips 7, but so as to leave the entire coating 6 intact. The sheet is then wetted without soaking with the result that the unhardened strips 7 are rendered oil-repellent and they tend to absorb a water-absorbing ink. Thereafter the right-hand view is printed over the entire back of sheet 2 with an oil ink, but the ink is repelled by the wet strips 7 with the result that the view is printed only on the strips 5 at 26. The left-hand view is then printed over the entire back of the sheet with a water ink and this ink is absorbed into strips 7 but it is repelled by the surface of hardened strips 5; the presence of this ink in strips 7 is designated by small dots in Figure 4. A paper backing 28 is then applied the same as at 16 in Figure 2.

In Figure 5, apparatus is represented for producing sheets of the character referred to above, such as sheet 2, where optical alignment is provided between the lenses on the front of the sheet and the coating strips on the back of the sheet. Accordingly, a roll 30 of the lenticulated film or sheet 2 is shown; the sheet 2 forming roll 30 has on its front surface (the outer surface in the roll) cylindrical lenses which extend lengthwise of the sheet. On the back side of the sheet is the unhardened gelatin coating which is sensitive to light. This sheet passes to the right from roll 30 around a roller 32, thence downwardly through an exposure zone, and around a roller 34. From roller 34 the sheet passes to the left around a roller 36 and downwardly into a tank 38 containing a water bath 54; here the sheet passes around a series of rollers 40, and it then passes out of the tank and to the left over a roller 44 and past a pair of drying lamps 56 after which it is rolled into a roll 46 again. The longitudinal lenticulations in the sheet promote the run-off of water from the sheet as the sheet moves upwardly to roller 44.

When passing from roll 30 to roll 44, the sheet is maintained in darkness by the light-tight enclosure 48, except when it passes through the exposure zone where it passes an opening 50; in this exposure zone the sheet is exposed to the light from a light source 52 which is shown as a tubular lamp, e. g., ordinary fluorescent or Lumiline lamp. As indicated above, the lenses on the front of the sheet extend longitudinally of the sheet and thus as the sheet passes between rollers 32 and 34 the lenses extend vertically. The light source 52 is so positioned with respect to the sheet that it occupies a position corresponding to the position 10 in Figure 1, and with its axis parallel to the lenticulations on sheet 2. Furthermore, the reflector on the light source 52 (or the width of the diffusing tube, if no reflector is used) is of a width corresponding to the distance between points A and B of Figure 1. Thus, in Figure 5, as a particular portion of sheet 2 moves downwardly from behind mask 48, it is exposed to light from the light source 52 in such a manner that the strips corresponding to strips 5 in Figure 1 are hardened. The width of opening 50 is such that the gelatin in the exposed areas 5 is hardened by the time it passes the opening.

Thus, as the sheet moves from opening 50 it is of the character shown in Figure 1, and, when desirable, this sheet can be rolled into a roll at 34 without further processing. It should be noted, however, that with this type of sheet the strips 7 are still sensitive to light and for this reason the sheet must be maintained in darkness. When it is desirable to form a sheet such as that shown in Figure 2 the exposed sheet moving from opening 50 is washed in warm water to remove the unhardened gelatin of strips 7, leaving the strips 5 in place. When it is desirable to form a sheet such as that shown in Figure 4, the exposed sheet moving from opening 50 is washed in cold water so as to dissolve the bichromate out of the gelatin of strips 7, thus rendering this gelatin unsensitive to light. The processed sheet may be cut into lengths suitable for use and then printed, or it may be printed before cutting.

In the embodiment of the invention shown in

Figure 6, optically-controlled, mechanical alignment is provided between lenses 64 on the front side of a sheet 62 and strips 65 printed on the back side of the sheet. Accordingly, the uncoated sheet 62 has strips 65 only printed thereon using a printing roll which is maintained in the proper relationship to the lenses 64 optically. Illustratively, this alignment is maintained by apparatus indicated schematically in Figure 11. At the edge of sheet 62, for example, light is projected from a light source 110 downwardly toward the lenticulated side of the sheet and this light passes through a single lens and a slit 112 in the top of a casing 114. Within casing 114 in alignment with the light ray from slit 112 are two photoelectric cells 116 and 117 which are connected to a control circuit, not shown. These two photoelectric cells indicate to the control circuit whether or not the lenses on sheet 62 are positioned properly with respect to the strips of gelatin which are being printed onto the sheet. During the time that proper alignment exists, the light through slit 112 plays equally upon the two photoelectric cells. However, when proper alignment is not maintained the lens is displaced and more light is directed upon one photoelectric cell than upon the other; this causes the control circuit to produce a compensating effect so that the sheet is brought back into alignment again. For example, if more light is directed upon cell 116 than upon cell 117, the control circuit causes the sheet to move with respect to slit 112, and thus with respect to the printing roller, so that proper alignment is again established.

In Figure 7, which represents a manner of using the sheet represented in Figure 6, the picture is made by first printing the left-hand view over the entire back of the sheet; that is, over the surface of gelatin strips 65 (Figure 6) as well as over the uncoated strips 67 therebetween at 68 (Figure 7). Thereafter, the entire back of the sheet is printed with an opaque reflecting material, such as, white pigment, in a vehicle which does not readily take to the gelatin but does take to the sheet at strips 67; this forms a backing 70 for the strips 68 of the left-hand view. Sheet 62 is then immersed in a warm water solution which dissolves away the gelatin strips 65 with the result that the sheet is exposed at uncoated strips 73 between the printed strips 68. The right-hand view is then printed on strips 73 at 74 on the back of the sheet with a soft roll, and the entire sheet is then backed by a paper backing 72. Thus, the left-hand view is viewed by the left eye through sheet 62 at the strips designated in Figure 6 at 67 whereas the right-hand view is viewed by the right eye at the strips originally covered by the gelatin strips 65.

In the embodiment of the invention represented in Figure 8, a cellulosic sheet 82, having lenses 84 on its front side and gelatin strips 86 on its back side, is etched to form grooves 88 between the strips 86. This etching is performed by first coating the back with a light hardenable gelatin; next, the sheet is exposed to light from the lenticulated side; then the unexposed gelatin is dissolved away and the sheet is treated with an etching solution, e. g., reagents such as cuprammonium which are known to produce water-soluble ethers. This process dissolves away surface portions or layers of the cellulose or cellulose ester or ether as the case may be in the strips 88 leaving depressed areas. The gelatin strips which act as a resist are then dissolved or swelled and stripped from the sheet. This sheet 82 is then printed as represented in Figure 9, e. g., by printing the left-hand view over the entire back of the sheet with a soft roll or transfer blanket, wiping clean the strips 90 between grooves 88, and then depositing over the entire sheet an opaque light reflecting coating and wiping this coating from the strips 90. A paper backing 94 which carries a reverse printing at 96 of the right-hand view is then applied to the back of the sheet.

Advantageously, the printing processes are performed by lithograph, offset or collotype processes in order to avoid or minimize problems of register between printing dots or lines and the narrow areas. Cameo and intaglio engraved plates, electrotypes and stereotypes may be used with some advantages provided that line plates are used instead of the usual dots and the plates are oriented with their lines transverse to the image strips on the back of the sheet 2.

In the preferred embodiments of the invention cylindrical lenses are provided which run longitudinally of the sheet. Under some circumstances, these cylindrical lenses may run transversely of the sheet. For example, in the embodiments of Figures 6 and 7, the printing of the gelatin strips 65 may be more easily performed when the strips extend transversely of the sheet. Each lens has a radius which is one-third the total thickness of sheet 2, and the width of each lens is one and one-third times its radius.

As indicated above, although I have referred above to gelatin as the most commonly used light-sensitive material, many other materials are known to be similarly light sensitive. Various resins and asphaltic materials have been used in this manner as resists in the photo-engraving art; furthermore, a number of the more recently developed synthetic resins, notably polyvinyl alcohol, are useful for this purpose. Partial polymers of monomers, for example methyl methacrylate, are known, which, although reasonably stable in the dark, polymerize on exposure to light. Applied layers of such substances can be made to form raised areas 5 by polymerization due to light focused thereon by lenses 4; the unpolymerized substance in the intermediate areas 7 is readily washed away.

As various embodiments may be made of the above invention and as changes might be made in the embodiment above set forth, it is to be understood that all matter hereinbefore set forth or shown in the accompanying drawings is to be interpreted as illustrated and not in a limiting sense.

I claim:

1. In apparatus for producing a sheet for use in forming stereoscopic pictures, the combination of, means to move through an exposing zone a sheet having lenticulations on one side and having a light-responsive coating on the other side, a concentrated light source positioned so as to direct light onto the sheet in said exposing zone from a position corresponding to the position which one eye would occupy during binocular viewing of a stereoscopic picture later to be formed on the sheet thereby to expose selected areas of said layer in definite fixed relation to the lenticulations, and means to remove the unexposed areas of the layer.

2. In apparatus for producing a sheet for use in forming stereoscopic pictures, the combination of, means to move through an exposing zone a sheet having lenticulations on one side and having a light-responsive coating on the other side, said coating being soluble before exposure but unsoluble after exposure, a light positioned so as to direct light onto the sheet in said exposing zone from a position corresponding to the one position which one eye would occupy during the viewing of a stereoscopic picture later to be formed on the sheet thereby to expose selected areas of said layer, means to immerse the sheet in a solvent to dissolve the unexposed areas of said layer, and means to dry the sheet.

3. In apparatus for forming a sheet for use in producing stereoscopic pictures, means to support a roll of a sheet which has on its front surface lenticulations through which the stereoscopic picture is to be viewed and which has on its back side a light-sensitive portion, means to move the sheet from the roll along a path parallel to the lenticulations, means to exclude light from said roll and from said path, means spaced from said path to provide light directed toward the front side of the sheet from a single zone corresponding to the viewing zone of one eye when viewing a stereoscopic picture later produced on the back side of the sheet, and means to render the light-sensitive portion unsensitive to further change by exposure to light.

4. Apparatus as described in claim 3 wherein said means to render the portion unsensitive is means to wash the unexposed areas of the light-sensitive portion from the sheet.

WALDEMAR A. AYRES.

REFERENCES CITED

The following references are of record in the file of this patent:

UNITED STATES PATENTS

| Number | Name | Date |
|---|---|---|
| 830,741 | Prentiss | Sept. 11, 1906 |
| 1,128,979 | Hess | Feb. 16, 1915 |
| 1,605,062 | Powrie | Nov. 2, 1926 |
| 1,882,424 | Ives | Oct. 11, 1932 |
| 1,918,705 | Ives | July 18, 1933 |
| 1,984,004 | Wildhaber | Dec. 11, 1934 |
| 1,989,553 | Kanolt | Jan. 29, 1935 |
| 2,008,239 | Bonamico | July 16, 1935 |
| 2,011,932 | Ives | Aug. 20, 1935 |
| 2,064,058 | Eggert et al. | Dec. 15, 1936 |
| 2,066,727 | Heymer | Jan. 5, 1937 |
| 2,115,198 | Eggert et al. | Apr. 26, 1938 |
| 2,140,702 | Kanolt | Dec. 20, 1938 |
| 2,150,932 | McDonnell | Mar. 21, 1939 |
| 2,177,417 | Eggert et al. | Oct. 24, 1939 |
| 2,219,158 | Benschoten | Oct. 22, 1940 |
| 2,279,825 | Kaszab | Apr. 14, 1942 |
| 2,336,331 | Wittel et al. | Dec. 7, 1943 |
| 2,351,032 | Gabor | June 13, 1944 |
| 2,361,347 | Brown | Oct. 24, 1944 |